(12) United States Patent
Lantz

(10) Patent No.: US 6,909,543 B2
(45) Date of Patent: Jun. 21, 2005

(54) FOVEATED DISPLAY SYSTEM

(75) Inventor: Edward J. Lantz, Parkesburg, PA (US)

(73) Assignee: Spitz, Inc., Chadds Ford, PA (US)

( * ) Notice: Subject to any disclaimer, the term of this patent is extended or adjusted under 35 U.S.C. 154(b) by 135 days.

(21) Appl. No.: 10/622,968

(22) Filed: Jul. 18, 2003

(65) Prior Publication Data

US 2004/0017608 A1 Jan. 29, 2004

Related U.S. Application Data

(60) Provisional application No. 60/398,007, filed on Jul. 22, 2002.

(51) Int. Cl.$^7$ .......................... G03B 21/56; G03B 21/14; G03B 21/00; H04N 7/00
(52) U.S. Cl. .......................... 359/451; 359/443; 348/36; 348/39; 353/11; 353/70
(58) Field of Search .............................. 359/443, 451; 348/36, 39; 353/11, 69–70

(56) References Cited

U.S. PATENT DOCUMENTS

| | | | |
|---|---|---|---|
| 3,695,751 A | 10/1972 | Watanuki | 352/70 |
| 4,012,126 A | 3/1977 | Rosendahl et al. | 359/725 |
| 4,070,098 A | 1/1978 | Buchroeder | 359/725 |
| 4,154,514 A | 5/1979 | Harvey | 352/69 |
| 4,427,274 A | 1/1984 | Pund et al. | 353/99 |
| 4,484,801 A | 11/1984 | Cox | 359/725 |
| 4,500,163 A * | 2/1985 | Burns et al. | 359/15 |
| 4,547,050 A | 10/1985 | Collender | 352/43 |
| 5,136,390 A | 8/1992 | Inova et al. | 348/383 |
| 5,175,575 A | 12/1992 | Gersuk | 353/94 |
| 5,376,980 A | 12/1994 | Gersuk et al. | 353/94 |
| 5,541,769 A | 7/1996 | Ansley et al. | 359/451 |
| 5,611,174 A * | 3/1997 | Hayashi | 52/8 |
| 5,627,675 A | 5/1997 | Davis et al. | 359/366 |
| 5,631,778 A | 5/1997 | Powell | 359/724 |
| 5,638,208 A | 6/1997 | Walker | 359/443 |
| 5,724,775 A | 3/1998 | Zobel, Jr. et al. | 52/82 |
| 5,760,826 A | 6/1998 | Nayar | 348/36 |
| 5,762,413 A | 6/1998 | Colucci et al. | 353/122 |
| 5,790,182 A | 8/1998 | St. Hilaire | 348/36 |
| 5,847,879 A | 12/1998 | Cook | 359/631 |
| 6,220,713 B1 | 4/2001 | Tadic-Galeb et al. | 353/77 |
| 6,530,667 B1 * | 3/2003 | Idaszak et al. | 353/122 |
| 6,712,477 B2 * | 3/2004 | Idaszak et al. | 353/122 |
| 6,727,971 B2 * | 4/2004 | Lucas | 352/85 |
| 6,733,136 B2 * | 5/2004 | Lantz et al. | 353/79 |
| 2001/0040671 A1 | 11/2001 | Metcalf | 353/94 |
| 2002/0009699 A1 * | 1/2002 | Hyodo et al. | 434/285 |
| 2002/0131018 A1 | 9/2002 | Lucas | 352/85 |
| 2002/0141053 A1 | 10/2002 | Colucci et al. | 359/435 |

OTHER PUBLICATIONS

Kinder, Floyd A., "Visual Control Using Wide Angle Displays (VISCON)", Society of Photo–Optical Instrumentation Engineers Seminar Proceedings (Photo–Optical Techniques in Simulators), vol. 17, pp. 103–105 (1969).

* cited by examiner

Primary Examiner—Rodney Fuller
Assistant Examiner—Magda Cruz
(74) Attorney, Agent, or Firm—Gary M. Cohen

(57) ABSTRACT

An improved theater geometry which is capable of providing improved image resolution and improved image contrast over prior systems is achieved with a unique projection geometry and image re-mapping technique. The projected image is provided with a continuously variable image resolution and brightness over the surface of a preferably dome-shaped screen which is to receive the image, concentrating the resolution and the brightness of the image within the central field-of-view of viewers that are unidirectionally seated in the theater, and sacrificing resolution and brightness toward the outside edges of the viewers' field-of-view. The result is a more efficient use of available projector resolution and brightness, an increase in the number of quality seats available in the theater, and an enhanced image contrast due to reductions in the light which is scattering from image elements to the rear of the screen.

45 Claims, 5 Drawing Sheets

FOVEATED DISPLAY SYSTEM

This application claims benefit of application Ser. No. 60/398,007 filed on Jul. 22, 2002.

FIELD OF THE INVENTION

This invention generally relates to immersive dome theaters, including large-format film theaters and video-based digital dome theaters which are generally spherical in shape, and which can be hemispheric, hypohemispheric, or hyperhemispheric in extent.

BACKGROUND OF THE INVENTION

A typical installation for a modern dome theater is shown in FIG. 1. Most modern dome theaters 1 utilize a dome 2 which is tilted forward and which has unidirectional seating 3 mounted on a stadium-type seating deck 4. An omni-type, large format film projector 5 is then situated within the theater space 6 which is defined by the dome 2. Examples of such dome theaters would include the IMAX™ Dome system, available from Imax Corporation, and the Cinedome™ format available from Iwerks.

The projector 5 is generally positioned behind the center 7 of the dome 2 or, as an alternative, at the center 7 of the dome 2, and typically uses a "fisheye" type lens (not shown) that has a very large field-of-view (e.g., 150 to 180 degrees). The projector 5 is accessed from a sub-floor 8 (i.e., from under the seating deck 4). A so-called "dog house" 9 is provided to contain the projector 5, which typically protrudes into the theater space 6. This leads to the disadvantage that valuable seating space is taken up in a prime viewing location, that being the center of the theater 1.

Another major problem with modern dome theaters is caused by scattered light. Since the projection screen (the dome 2) is curved, the image projected onto one portion of the screen can scatter light onto remaining portions of the screen. This leads to the disadvantage that the contrast of the resulting image can be reduced.

Another problem associated with modern dome theaters is the difficulty of obtaining sufficient image resolution, primarily due to the extremely wide field-of-view of the projection system. Eye-limited resolution over a hemispheric field-of-view requires a large number of pixels. This number is given by the following equation:

$$\text{Number of pixels} = \frac{(2\pi \text{ steradians})(57.3°/\text{steradian})^2(60 \text{ arc min/deg})^2}{(0.5 \text{ arc min/pixel})^2} = 300 \text{ million pixels}$$

No medium is presently known which is capable of achieving this resolution. For example, large-format films (15 perf/70 mm) are capable of an effective pixel resolution on the order of 10 to 12 million. Video projectors, however, are currently only capable of an effective pixel resolution on the order of 3 million.

The limited resolution of video projectors has prevented the use of "single-lens" projection schemes. Instead, multiple, edge-blended projectors have been required to achieve a large, seamless, high-resolution image. Such systems, however, have the disadvantages of being expensive and difficult to maintain. It is also difficult to format content for such systems because the images must be split into separate frames, for projection by individual projectors, which must carefully reconstruct the image on the dome screen using edge-blending techniques.

Another problem associated with modern dome projection systems is that the brightness of the image tends to be somewhat limited. While flat-screen theaters easily fulfill the current SMPTE cinematic standard for brightness of 12 foot-Lamberts, dome theaters usually provide a brightness on the order of 3 to 4 foot-Lamberts, or less, due to their large image area and the limited brightness of the projectors.

SUMMARY OF THE INVENTION

The present invention provides an improved theater geometry which is capable of providing improved image resolution and improved image contrast over prior systems. This is achieved with a unique projection geometry and image re-mapping technique.

The improvements of the present invention exploit the known phenomena that the human visual system is "foveated", i.e., that the central field-of-view of the human eye has a higher resolution than its peripheral field-of-view (see, J. M. Rolfe, et al., *Flight Simulation*, Cambridge Press, New York, 1986), and that most people exercise limited head motion when viewing films, even when given a fully immersive field-of-view (see, R. Pausch, et al., "Disney's Aladdin: First Steps Toward Storytelling in Virtual Reality", ACM SIGGRAPH 96 Conference Proc., August 1996). The combined effect of this is that image resolution is most important in the central region of the dome screen, and less important at the sides and the rear of the dome screen.

In accordance with the present invention, the projected image is provided with a continuously variable image resolution and brightness over the surface of the dome, in this way concentrating the resolution and the brightness of the image within the central field-of-view of viewers that are unidirectionally seated in the theater, and sacrificing resolution and brightness toward the outside edges of the viewers' field-of-view. The result is a more efficient use of available projector resolution and brightness, an increase in the number of quality seats available in the theater, and an enhanced image contrast due to reductions in the light which is scattering from image elements to the rear of the dome.

DETAILED DESCRIPTION OF THE INVENTION

Figure 1:
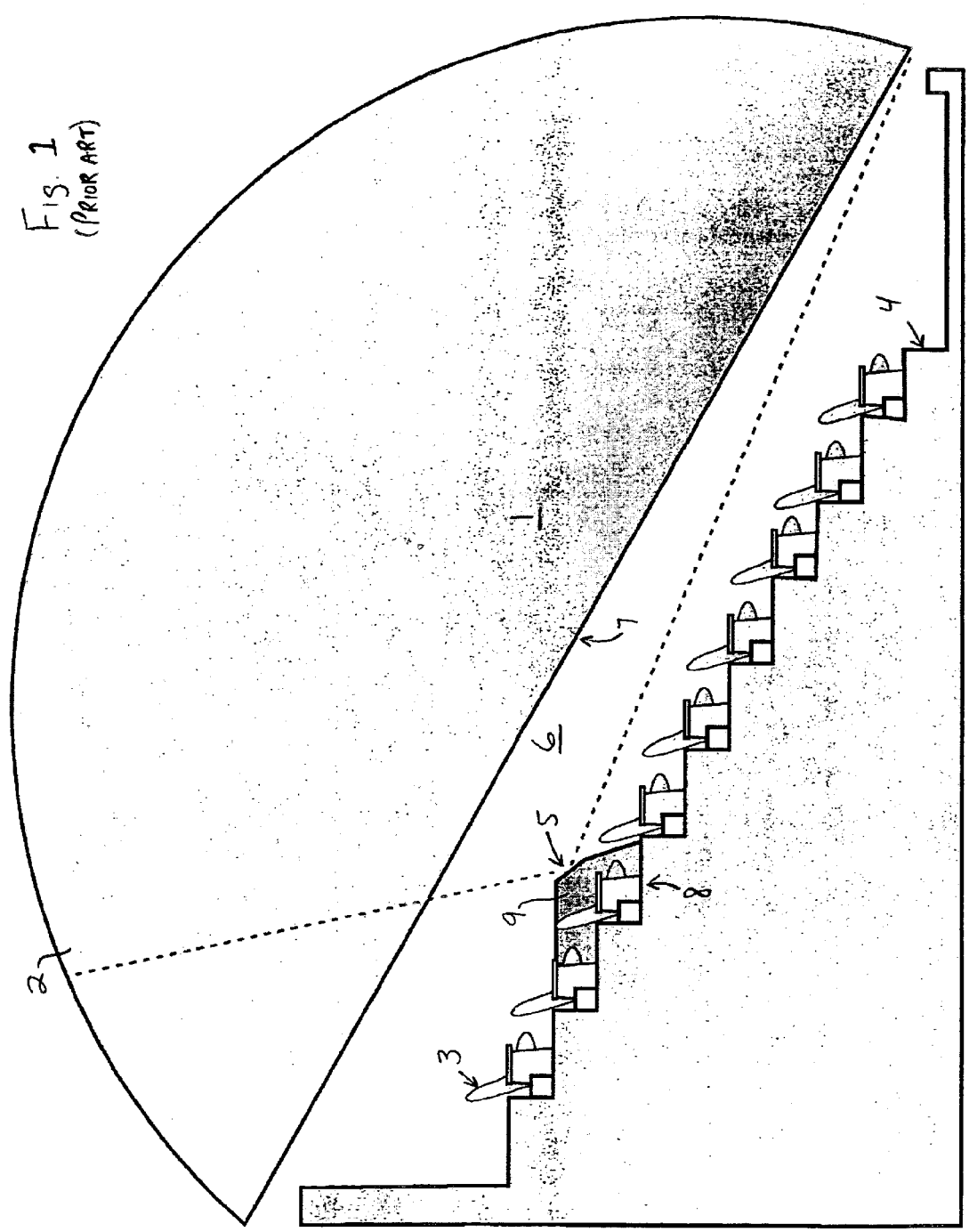
FIG. 1 is a schematic view of a typical omni-format film theater.
Figure 2:
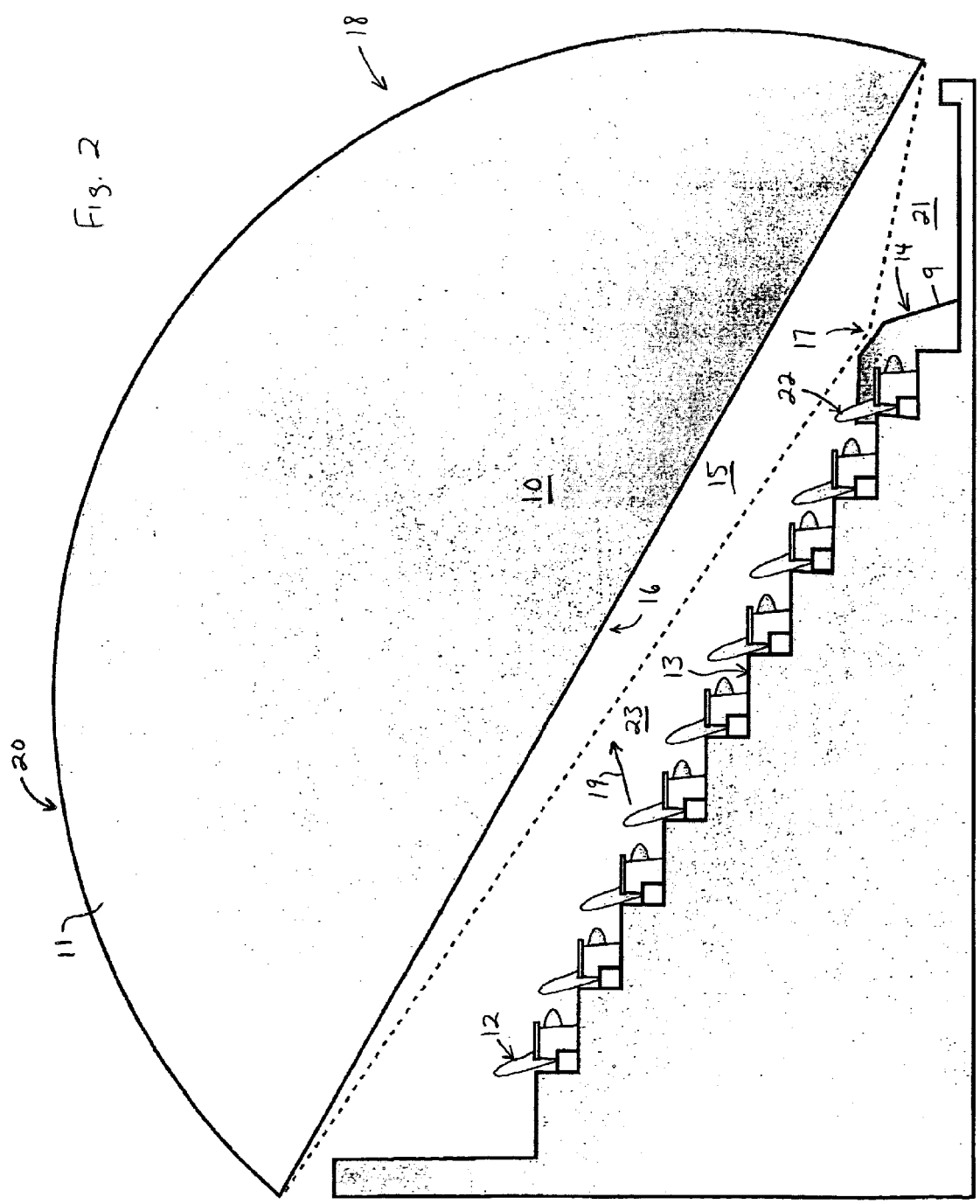
FIG. 2 is a schematic view of a theater having a projector which is located for producing a foveated display in accordance with the present invention.

FIG. 2 shows an installation for a dome theater 10 having a display which has been "foveated", in accordance with the present invention. As with the theater 1 shown in FIG. 1, the theater 10 utilizes a dome-shaped screen 11 (hereafter also referred to as the "dome") which is tilted forward, and has unidirectional seating 12 which is mounted on a stadium-type seating deck 13. An omni-type, large format projector 14 (either a film or a video projector) is situated within the theater space 15 which is defined by the dome 11. Such theaters can again include theater systems such as the previously mentioned IMAX™ Dome system, available from Imax Corporation, and the Cinedome™ format available from Iwerks, as well as other theater systems that may be in existence or that may be developed in the future.

In accordance with the present invention, the projector 14 is placed substantially in front of the center 16 of the dome 11. A "fisheye" type lens 17 (having a very large field-of-view on the order of 150 to 180 degrees) is again coupled with the projector 14, and the source image is specially mapped to correct for distortion created by parallax in the projector, as follows.

Pixels in the front of the dome screen 11 (at 18) are made smaller, resulting in a higher resolution in the direction that the viewers are facing (shown by the arrow 19). Conversely, the pixels in the rear of the dome screen 11 (at 20) are made larger. For a given projector resolution, the projected resolution is effectively sacrificed in the rear of the theater (at 20, behind most of the viewers) to boost the resolution in the front of the theater (at 18). This results in a higher perceived resolution, since the pixels in the rear 20 of the theater 10 will lie in the outer edges of the viewers' peripheral vision, where visual acuity is generally the lowest, and do not substantially contribute to the quality of the resulting image. As a result, the pixels in the rear 20 of the theater 10 are not perceptibly missed. Pixels are instead concentrated in the front 18 of the theater 10, where visual acuity is generally the highest and the viewers' attention is most focused.

The brightness of the image at the front 18 of the dome screen 11 is increased, while the brightness of the image at the rear 20 of the dome screen 11 is decreased. This decrease in the brightness of the image, toward the rear 20, improves contrast in the central, high-resolution regions (the center 16 and the front 18) since less light is scattered from scenes in the rear 20 onto the front 18 of the dome screen 11. Again, this drop in brightness occurs in regions of the dome screen 11 that lie on the outer fringes of a viewer's peripheral vision, which does not substantially detract from the projected image.

The projector 14 is preferably located in the front 21 of the theater 10, possibly in front of the first row of seats 22. This permits a greater number of seats to be placed in the theater 10, particularly in the center 23 of the seating deck 13 (i.e., at the center of the theater), seats which had previously been taken up by the projector-receiving "doghouse" 9. This, in turn, restores the highest quality seats to the theater 10.

In the case of a video projector, the increased resolution and brightness in the prime image area can be sufficient to achieve cinematic quality, allowing a single projector to replace the less reliable, multi-projector, edge-blended video display systems currently in use.

Because the foveated effect is achieved using a single projector 14, with a fisheye lens 17, the drop in brightness and resolution from the front 18 of the dome screen 11 to the rear 20 of the dome screen 11 is graceful and slowly varying. Provided the displacement of the projector 14 from the center 16 of the dome 11 falls within a desired range of values, it will be difficult for the drop in brightness and resolution to be noticed by the untrained eye.

Figure 3:
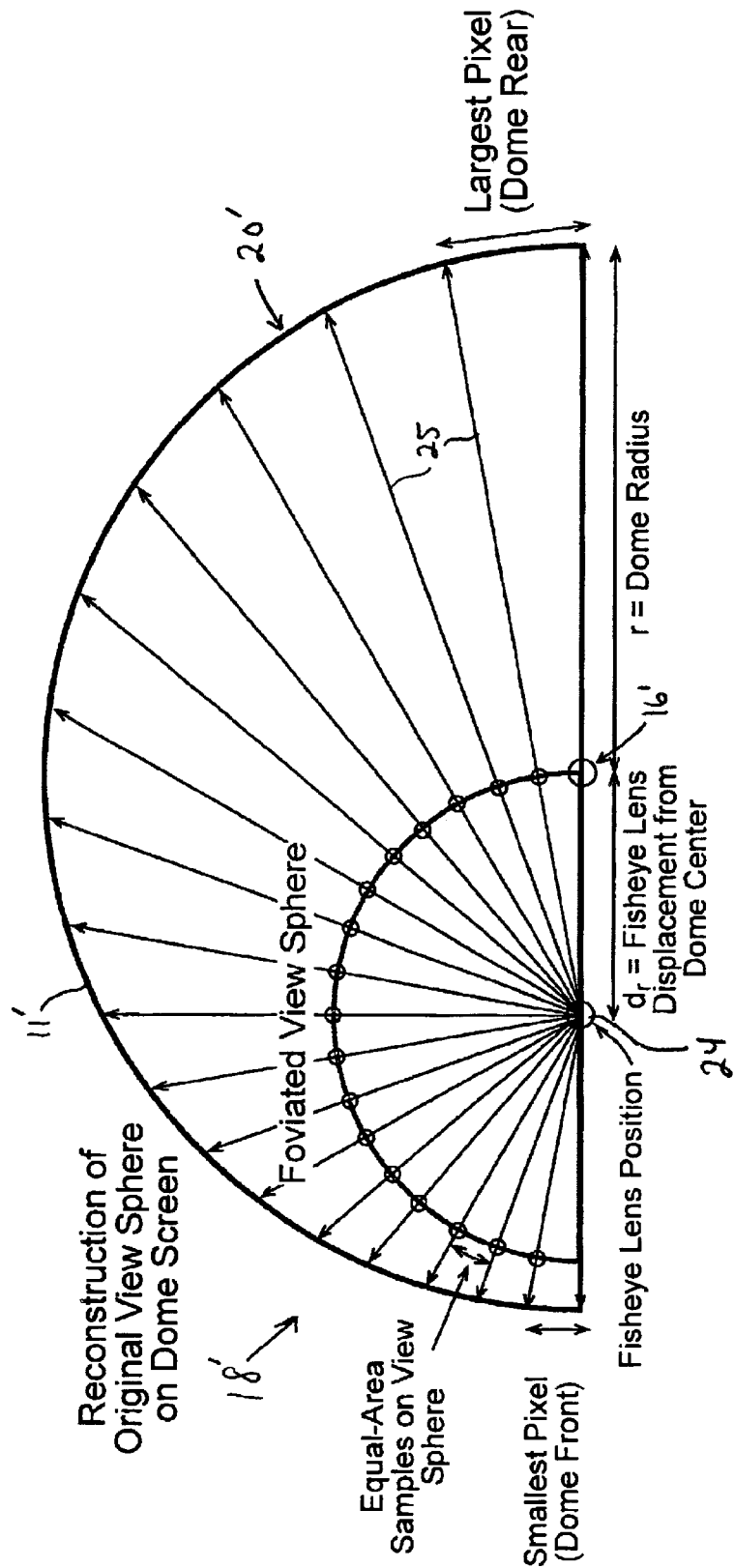
FIG. 3 is a schematic view showing the reconstruction and projection of an image which has been foveated in accordance with the present invention, for a spherical field-of-view.

FIG. 3 generally illustrates the operating principal of a display which has been foveated in accordance with the present invention. Since the front 18' of the dome 11' is closer to the projection lens (schematically shown at 24), the pixels at the front 18' of the dome 11' are smallest and brightest. Conversely, the pixels at the rear 20' of the dome 11' are the largest, because the length of the projection path 25 for the pixels at the rear 20' of the theater is the longest. The greater the displacement ($d_r$) of the projection (fisheye) lens 24 from the center 16' of the dome 11', the greater the foveated effect that will result.

A normalized projector displacement ratio (R) is given by the ratio $d_r/r$. Consequently, the size of the pixels in the front 18' of the theater will be scaled down by a factor $S_f$, where $S_f=(r-d_r)/r$, with respect to conventional projection from the center 16' of the dome 11' ($d_r=0$), while the size of the pixels at the rear 20' of the theater will be scaled up by a factor $S_b$, where $S_b=(r+d_r)/r$, relative to projection from the center 16' of the dome 11'. A measure of the degree of foveation is provided by the "front-to-back" resolution ratio (F) which is given by the ratio $F=S_b/S_f$. Foveation is the ratio of the resolution (and brightness) of the image in the front 18' of the theater versus the resolution (and brightness) of the image in the rear 20' of the theater.

It can also be shown that the critical field-of-view (measured at the equator of the dome, shown at 26 in FIG. 4, with respect to an eyepoint 27 at the center 16' of the dome 11') for which the pixel resolution equals that of conventional (dome-centered) projection, $\theta_c$, is given by the equation $2\cos^{-1}(R/2)$. Within this field-of-view, the pixel resolution (and image brightness) will exceed that of conventional, dome-centered projection. Outside of this field-of-view, the pixel resolution (and image brightness) will drop below that of conventional, dome-centered projection. The value of $\theta_c$ is an important parameter for providing a foveated display since it dictates the area on the dome for which an elevated brightness and resolution are achieved.

The following table (Table 1) provides an example of a list of foveated display parameters versus a projector displacement ratio, R.

TABLE 1

| Projector Displacement Ratio, R | Critical Field of View, $\theta_c$ | Normalized Front Pixel Size, $S_f$ | Normalized Back Pixel Size, $S_b$ | Foveation F = $S_b/S_f$ |
|---|---|---|---|---|
| 0 | Full Dome | 1.0 | 1.0 | 1.0 |
| 0.1 | 174° | 0.9 | 1.1 | 1.22 |
| 0.2 | 169° | 0.8 | 1.2 | 1.50 |
| 0.3 | 163° | 0.7 | 1.3 | 1.86 |
| 0.4 | 157° | 0.6 | 1.4 | 2.33 |
| 0.5 | 151° | 0.5 | 1.5 | 3.00 |
| 0.6 | 145° | 0.4 | 1.6 | 4.00 |
| 0.7 | 139° | 0.3 | 1.7 | 5.67 |
| 0.8 | 133° | 0.2 | 1.8 | 9.00 |
| 0.9 | 127° | 0.1 | 1.9 | 19.00 |
| 1.0 | 120° | 0 | 2.0 | Infinity |

The values of $\theta_c$, $S_f$, $S_b$ and F are listed in Table 1 as a function of the projector displacement ratio (R). Note that, even as R approaches 1.0 (i.e., the projector lens 17 approaches the front surface 18' of the dome 11'), $\theta_c$ does not drop below 120°. The corresponding foveation (F) increases exponentially with the projector displacement (R). Lower values of F (e.g., for F<1.5) will not produce a noticeable foveation effect, while higher values (e.g., F>6) will likely be objectionable, depending on the seating arrangement, image content, and other factors. Since brightness variations due to foveation will likely be more noticeable than resolution variations, a brightness compensation mask can be applied to the image, either optically or electronically, to create a more even image brightness over the dome screen by gradually attenuating brightness in the front of the image area.

Figure 4:
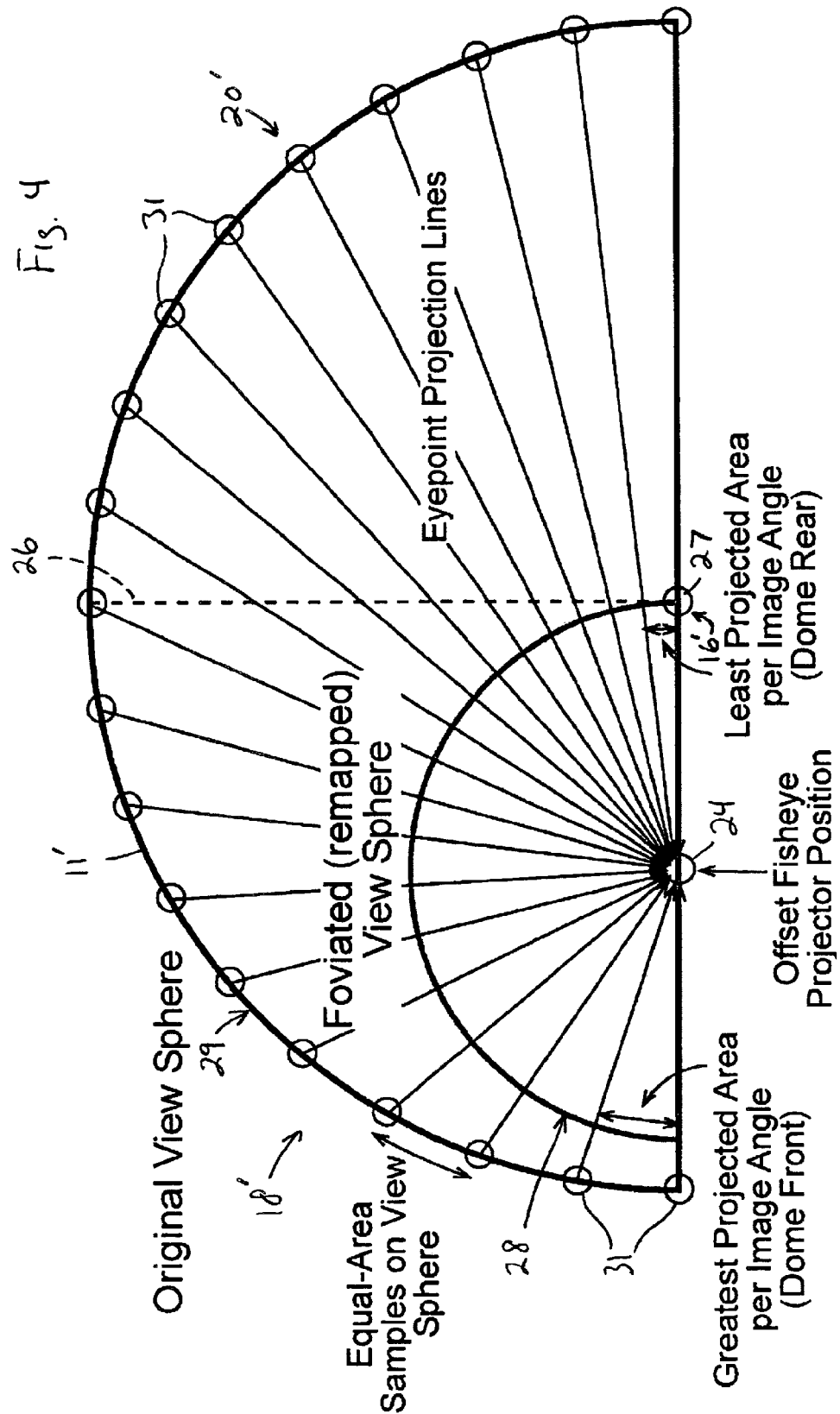
FIG. 4 is a schematic view showing the eyepoint projection for generating an image which has been foveated in accordance with the present invention.
Figure 5:
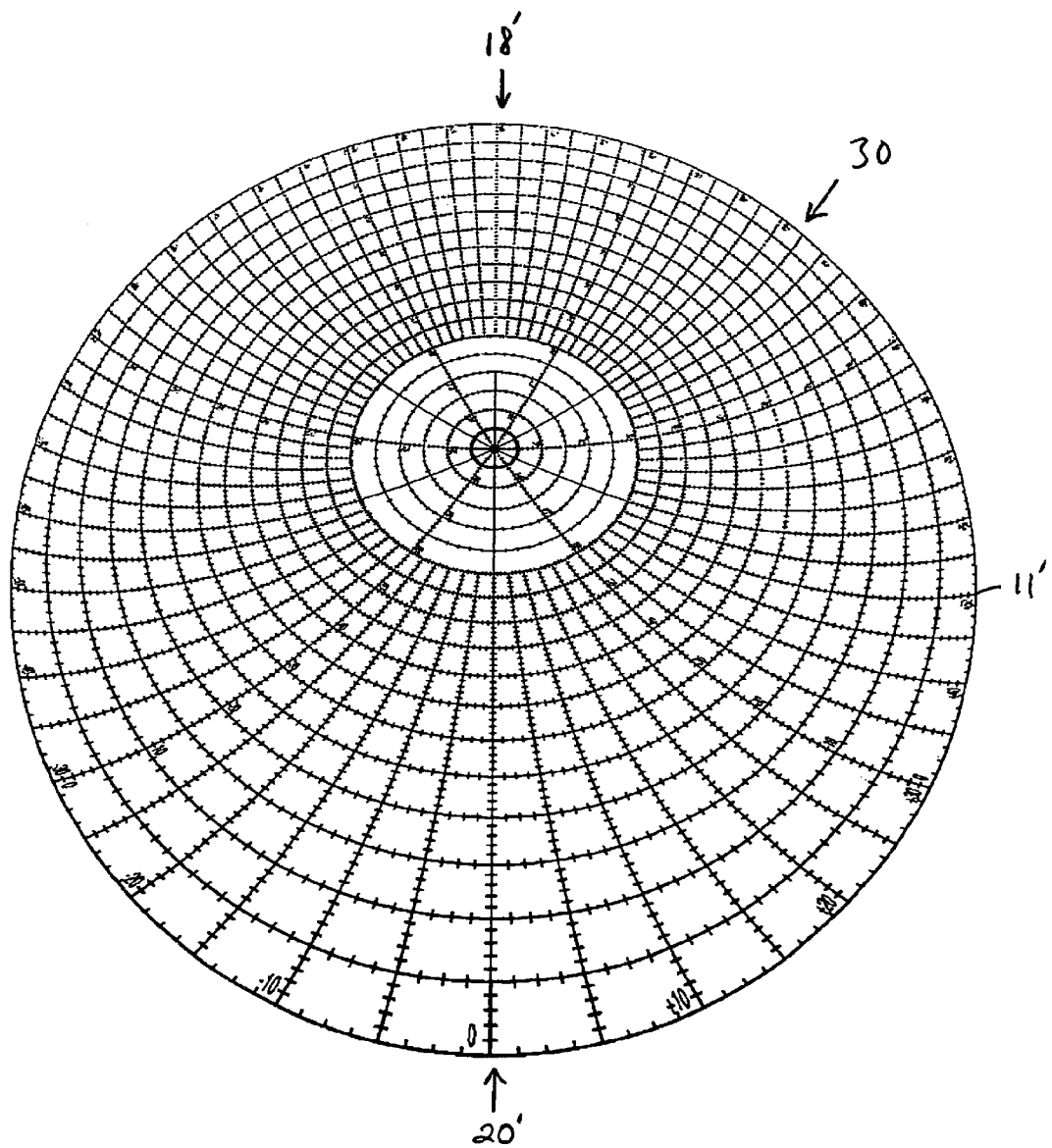
FIG. 5 is an azimuthal equidistant map showing a hemispheric grid image which has been foveated in accordance with the present invention.

To successfully achieve the above-described, foveated effect, special image re-mapping is required to result in a sphere having a foveated view. Referring to FIG. 4, the image re-mapping which is required to achieve a sphere 28 having a foveated view (based on an original, un-foveated view sphere 29) is based on a three-dimensional eyepoint projection. The foveated image 30 which results is shown in FIG. 5, in equidistant polar mapping with a hemispheric grid. It is to be noted that the larger image area (i.e., having a higher pixel density) is found at the front 18' of the dome 11'. In its preferred embodiment, digital image processing is used as the mapping algorithm. With the source image in a digital format, the algorithm is performed digitally, either in real time for immediate projection, or as an off-line process. In an off-line process, the resulting frames can be output to a digital video storage medium for video-based projection, or scanned onto film in the case of a film-based projection theater.

Eyepoint mapping procedures which are otherwise known to persons of ordinary skill in the fields of geometric mapping and software development can be used to implement the foregoing image re-mapping procedures, based on the following description. An original spherical image is mapped onto a virtual dome (the dome 29 shown in FIG. 4). The pixels on this view sphere (the circles 31 shown on the surface of the dome 29 in FIG. 4) are geometrically projected onto the foveated view sphere (the dome 28 shown in FIG. 4), which is displaced by the ratio (R). The foveated view sphere is then prepared appropriately for fisheye projection. Typically, this preparation is a 2-dimensional, equidistant azimuthal or polar mapping. In practice, the eyepoint mapping can be performed as a 2-dimensional image warping operation (note, for example, the mapping shown in FIG. 5).

It will be understood that various changes in the details, materials and arrangement of parts which have been herein described and illustrated in order to explain the nature of this invention may be made by those skilled in the art within the principle and scope of the invention as expressed in the following claims.

What is claimed is:

1. An image projection system comprising:
    a screen having a curved image-receiving surface, wherein the curved surface defines a radial center for the screen, and wherein the radial center of the screen is separated from the curved surface by a defined radius;
    a projector for relaying images onto the screen, wherein the projector is positioned at a projection point which is located between the surface of the screen and the radial center of the screen; and
    a lens coupled with the projector, wherein the lens is a fisheye-type lens;
    wherein a processor maps the images produced from source images to correct for distortion created by parallax resulting from displacement of the projector from the radial center of the screen.

2. The system of claim 1 wherein the screen is substantially spherical in shape.

3. The system of claim 1 wherein the images are comprised of a plurality of pixels, and wherein forwardmost pixels located toward the front of the screen are made smaller than rearwardmost pixels located toward the rear of the screen, thereby developing a higher resolution toward the front of the screen and a lower resolution toward the rear of the screen.

4. The system of claim 3 wherein a normalized displacement ratio (R) is given by a ratio of a displacement of the projector from the radial center of the screen ($d_r$) to the defined radius (r), wherein the size of the forwardmost pixels is scaled down by a factor ($S_f$), where $S_f=(r-d_r)/r$, and wherein the size of the rearwardmost pixels is scaled up by a factor ($S_b$), where $S_b=(r+d_r)/r$.

5. The system of claim 4 wherein a front-to-back resolution ratio (F) is given by the ratio $F=S_b/S_f$, and wherein the front-to-back resolution ratio (F) is between 1.5 and 6.

6. The system of claim 1 wherein the images have a forwardmost brightness for portions of the images toward the front of the screen which is brighter than a rearwardmost brightness for portions of the images toward the rear of the screen.

7. The system of claim 6 wherein a higher contrast is developed toward the front of the screen and a lower contrast is developed toward the rear of the screen.

8. The system of claim 6 which further includes a brightness compensation mask applied to the source images.

9. The system of claim 8 wherein the brightness compensation mask is optically applied to the source images.

10. The system of claim 8 wherein the brightness compensation mask is electronically applied to the source images.

11. The system of claim 1 wherein a critical field-of-view is measured at an equator of the curved surface of the screen, with respect to a point at the radial center of the screen, within which an actual pixel resolution and an actual image brightness both exceed a resolution and a brightness produced by a projection from the radial center of the screen, and outside of which resolution and brightness drop below the resolution and the brightness produced by the projection from the radial center of the screen, wherein the critical field-of-view is given by the equation $2 \cos^{-1}(R/2)$, where (R) is a normalized displacement ratio given by a ratio of a displacement of the projector from the radial center of the screen to the defined radius.

12. The system of claim 11 wherein the critical field-of-view substantially matches an average viewer's primary visual field, and an area lying outside the critical field-of-view substantially matches the average viewer's peripheral visual field.

13. The system of claim 1 which further includes seating coupled with the screen, wherein the seating is grouped in plural rows, and wherein the projector is located at or between a first row of the seating nearest to the surface of the screen and the surface of the screen.

14. The system of claim 1 having only a single projector.

15. The system of claim 14 wherein the projector is a video projector.

16. The system of claim 14 wherein the projector is a film projector.

17. The system of claim 1 wherein the processer is a digital image processor for mapping the source images to correct for the distortion.

18. The system of claim 17 which further includes a three-dimensional eyepoint projection of the source images to correct for the distortion.

19. A method for projecting a series of images onto a screen having a curved image-receiving surface, wherein the curved surface defines a radial center for the screen, wherein the radial center of the screen is separated from the curved surface by a defined radius, and wherein the method comprises the steps of:
    positioning a projector for relaying the series of images onto the screen at a projection point which is located between the surface of the screen and the radial center of the screen;

projecting the series of images onto the screen using a lens coupled with the projector, wherein the lens is a fisheye-type lens; and producing the series of images from source images which are mapped to correct for distortion created by parallax resulting from displacement of the projector from the radial center of the screen.

20. The method of claim 19 wherein the screen is substantially spherical in shape.

21. The method of claim 19 wherein each of the series of images is comprised of a plurality of pixels, and which further includes the step of making forwardmost pixels located toward the front of the screen smaller than rearwardmost pixels located toward the rear of the screen, developing a higher resolution toward the front of the screen and developing a lower resolution toward the rear of the screen.

22. The method of claim 21 wherein a normalized displacement ratio (R) is given by a ratio of a displacement of the projector from the radial center of the screen ($d_r$) to the defined radius (r), and which further includes the step of scaling down the size of the forwardmost pixels by a factor ($S_f$), where $S_f=(r-d_r)/r$, and scaling up the size of the rearwardmost pixels by a factor ($S_b$), where $S_b=(r+d_r)/r$.

23. The method of claim 22 wherein a front-to-back resolution ratio (F) is given by the ratio $F=S_b/S_f$, and which further includes the step of setting the front-to-back resolution ratio (F) between 1.5 and 6.

24. The method of claim 19 which further includes the step of developing a forwardmost brightness for portions of the images toward the front of the screen which is brighter than a rearwardmost brightness for portions of the images toward the rear of the screen.

25. The method of claim 24 which further includes the step of developing a higher contrast toward the front of the screen and a lower contrast toward the rear of the screen.

26. The method of claim 24 which further includes the step of applying a brightness compensation mask to the source images.

27. The method of claim 26 which further includes the step of gradually attenuating the brightness for portions of the images toward the front of the screen using the brightness compensation mask.

28. The method of claim 26 which further includes the step of optically applying the brightness compensation mask to the source images.

29. The method of claim 26 which further includes the step of electronically applying the brightness compensation mask to the source images.

30. The method of claim 19 which further includes the step of measuring a critical field-of-view at an equator of the curved surface of the screen, with respect to a point at the radial center of the screen, within which an actual pixel resolution and an actual image brightness both exceed a resolution and a brightness produced by a projection from the radial center of the screen, and outside of which resolution and brightness drop below the resolution and the brightness produced by the projection from the radial center of the screen, wherein the critical field-of-view is given by the equation $2\cos^{-1}(R/2)$, where (R) is a normalized displacement ratio given by a ratio of a displacement of the projector from the radial center of the screen to the defined radius.

31. The method of claim 30 which further includes the step of selecting the critical field-of-view by adjusting the displacement ratio (R) so that the critical field-of-view substantially matches an average viewer's primary visual field, and an area lying outside the critical field-of-view substantially matches the average viewer's peripheral visual field.

32. The method of claim 19 wherein seating is coupled with the screen, wherein the seating is grouped in plural rows, and wherein the method further includes the step of locating the projector at or between a first row of the seating nearest to the surface of the screen and the surface of the screen.

33. The method of claim 19 which further includes the step of providing only a single projector for relaying images onto the screen.

34. The method of claim 33 wherein the projector projects video images onto the screen.

35. The method of claim 33 wherein the projector projects film images onto the screen.

36. The method of claim 19 which further includes the step of re-mapping the source images to correct for the distortion.

37. The method of claim 36 which further includes the step of re-mapping the source images to achieve a substantially spherical image.

38. The method of claim 36 which further includes the step of performing a three-dimensional eyepoint projection of the source images to correct for the distortion.

39. The method of claim 38 which further includes the step of applying digital image processing to the source images.

40. The method of claim 39 which further includes the step of applying the digital image processing to the source images in real time.

41. The method of claim 39 which further includes the step of outputting the re-mapped source images to a digital video storage medium.

42. The method of claim 39 which further includes the step of scanning the re-mapped source images onto a film medium.

43. The method of claim 38 wherein the three-dimensional eyepoint projection of the source images includes the steps of:

mapping an original spherical image onto a virtual sphere;

geometrically projecting pixels on the virtual sphere onto a view sphere which is displaced by a ratio (R), where (R) is given by a ratio of a displacement of the projector from the radial center of the screen to the defined radius; and preparing the view sphere which is displaced by the ratio (R) for fisheye projection.

44. The method of claim 43 wherein the preparing of the view sphere includes the step of performing a 2-dimensional, equidistant azimuthal or polar mapping.

45. The method of claim 38 wherein the three-dimensional eyepoint projection is performed as a two-dimensional image warping algorithm.

* * * * *